United States Patent [19]

Johnson

[11] Patent Number: 4,924,922
[45] Date of Patent: May 15, 1990

[54] BREW THROUGH LID FOR COFFEE MAKER

[75] Inventor: Paul D. Johnson, Hamden, Conn.

[73] Assignee: Black & Decker, Inc., Newark, Del.

[21] Appl. No.: 258,773

[22] Filed: Oct. 17, 1988

[51] Int. Cl.$^5$ .......................... A47J 31/24; B65B 3/07
[52] U.S. Cl. .................................... 141/346; 141/302;
 141/349; 141/352; 141/353; 141/354; 99/295
[58] Field of Search .............. 99/275, 279, 306, 323.3,
 99/295; 141/346, 347, 348, 349, 350, 351, 352,
 353, 354, 360, 362, 369, 370, 372, 302

[56] References Cited

U.S. PATENT DOCUMENTS

| | | |
|---|---|---|
| 535,252 | 3/1895 | Leggett . |
| 595,454 | 12/1897 | Foreman . |
| 618,624 | 1/1899 | Stanek et al. . |
| 1,907,770 | 3/1933 | Feagles et al. . |
| 3,015,411 | 1/1962 | Smith . |
| 3,136,241 | 6/1964 | Price . |
| 3,208,629 | 9/1965 | Beeson . |
| 3,307,595 | 3/1967 | Berning et al. ................. 141/348 X |
| 3,338,467 | 1/1967 | Albert ................. 220/90.4 |
| 3,561,506 | 2/1971 | Johnson ................. 141/360 |
| 3,938,564 | 2/1976 | Jones ................. 141/352 |
| 4,165,681 | 8/1979 | Belinkoff ................. 99/295 X |
| 4,184,603 | 1/1980 | Hamilton ................. 220/254 |
| 4,238,045 | 12/1980 | D'Andria ................. 220/90.4 |
| 4,356,848 | 11/1982 | Spies ................. 141/349 |
| 4,467,707 | 8/1984 | Amoit ................. 99/279 |
| 4,475,576 | 10/1984 | Simon ................. 141/98 |
| 4,482,083 | 11/1984 | Beck ................. 222/500 |
| 4,630,532 | 12/1986 | Sonnentag et al. ................. 99/279 |
| 4,667,587 | 5/1987 | Wunder ................. 99/295 |
| 4,694,738 | 9/1987 | Takozzi ................. 99/279 |
| 4,811,657 | 4/1989 | Rixen ................. 99/295 |
| 4,836,556 | 6/1983 | Romey, Sr. ................. 99/290 |

FOREIGN PATENT DOCUMENTS 2732053 2/1979 Fed. Rep. of Germany ........ 99/295

Primary Examiner—Ernest G. Cusick
Attorney, Agent, or Firm—Barry E. Deutsch

[57] ABSTRACT

A heat insulated coffee carafe for placement at the brewed coffee outlet of a coffee maker is provided with a securely fitting lid through which the coffee passes directly into the carafe without removal of the lid. When the carafe and its lid are placed in the coffee maker, mutual pressure between the lid and the coffee maker causes seals in the lid to open and permits the coffee to enter the carafe without removing the lid and with a minimal loss of heat and coffee aroma. Removal of the carafe and lid from the coffee maker automatically closes the seals to retain the heat and aroma in the carafe for long periods of use. In another embodiment a positive drip-stop seal in the coffee maker is closed automatically when the carafe is removed, whereby dripping from the coffee maker is prevented. In a further embodiment, a drip-stop seal in the coffee maker and a seal in the lid are both opened when the carafe is installed in the coffee maker. The flow capacity of the drip-stop seal is less than that of the seal in the lid, whereby flow control of the coffee is provided. Special provisions permit an unblocked exhaust flow of air while liquid is being admitted to the carafe.

8 Claims, 3 Drawing Sheets

BREW THROUGH LID FOR COFFEE MAKER

BACKGROUND OF THE INVENTION

The present invention relates to coffee makers and, more particularly, to coffee makers having a lid through which brewed coffee is passed into a carafe to be maintained in its hot, fresh-brewed, condition for extended periods of time.

Prior art coffee makers have disclosed the brewing of coffee by heating water in a hot water generator, directing the hot water into a basket containing coffee from which the brewed coffee is led into a carafe for dispensing into a coffee cup as desired. Such prior art devices are shown in U.S. Pat. Nos. 3,994,846, 386,556; 4,482,083; and U.S. Pat. No. 4,630,532. All, however, fail to provide a structure wherein the brewed coffee is maintained in a hot, flavorful condition.

OBJECTS AND SUMMARY OF THE INVENTION

It is an object of the present invention to provide a coffee maker and more particularly one having an insulated carafe and a carafe lid which will extend the time during which the brewed coffee is maintained in a hot and flavorful condition so that it may be used away from the coffee maker as, for example, at a desk or upon a table.

Another object of the invention is to provide a coffee maker which permits brewing directly into an insulated carafe (which is the only source of heat retention) through an insulating carafe lid which can remain in place upon the carafe during and after brewing.

Still another object of the present invention is to retain the heat of the coffee and its fresh-brewed taste and aroma by the use of a lid having an activating bobbin which opens just enough to let the coffee pass through it during brewing and then closes automatically when the carafe is removed from the coffee maker for use.

A further object of the present invention is to provide a simple, durable and relatively inexpensive lid structure which will perform satisfactorily without the shortcomings of prior art devices. Still another object of the present invention is to vent the hot brewed coffee within the carafe to the atmosphere without exposing the coffee to ambient air and without need for removing the carafe lid.

Briefly stated, the present invention provides a heat insulated coffee carafe for placement at the brewed coffee outlet of a coffee maker. The carafe includes a securely fitting lid through which the coffee passes directly into the carafe without removal of the lid. When the carafe and its lid are placed in the coffee maker, mutual pressure between the lid and the coffee maker causes seals in the lid to open and permits the coffee to enter the carafe without removing the lid and with a minimal loss of heat and coffee aroma. Removal of the carafe and lid from the coffee maker automatically closes the seals to retain the heat and aroma in the carafe for long periods of use. In another embodiment a positive drip-stop seal in the coffee maker is closed automatically when the the carafe is removed, whereby dripping from the coffee maker is prevented. In a further embodiment, a drip-stop seal in the coffee maker and a seal in the lid are both opened when the carafe is installed in the coffee maker. The flow capacity of the drip-stop seal is less than that of the seal in the lid, whereby flow control of the coffee is provided. Special provisions permit an unblocked exhaust flow of air while liquid is being admitted to the carafe.

According to an embodiment of the invention, there is provided a brew-through lid for a carafe comprising: means for engaging the lid atop the carafe, a seal in the lid, means responsive to installation of the carafe, with the lid engaged thereon, into a liquid dispensing apparatus for unseating the seal, means for permitting a liquid to flow through the seal into the carafe when the seal is unseated, and resilient means for seating the seal when the carafe, with the lid engaged thereon, is removed from the liquid dispensing apparatus.

According to a feature of the invention, there is provided a liquid dispenser for dispensing a liquid into a container comprising: a drip-stop seal, resilient means for sealing the drip-stop seal, whereby dripping of the liquid from the liquid dispenser is prevented, means for permitting installation of the container in the liquid dispenser, and cooperating means on the carafe and the liquid dispenser for unsealing the drip-stop seal in response to the installation.

According to a further feature of the invention, there is provided a liquid dispenser and a carafe therefor, comprising: a lid on the carafe, first means for admitting a flow of liquid into the carafe, first sealing means in the lid for sealing the first means for admitting when the carafe is removed from the liquid dispenser, the first means for admitting a flow including a first flow capacity, second means for admitting a flow of liquid from the liquid dispenser to the first means for admitting, second sealing means in the liquid dispenser for sealing the second means for admitting when the carafe is removed from the liquid dispenser, the second means for admitting including a second flow capacity, and the first flow capacity being greater than the second flow capacity.

The above and other objects, features and advantages of the present invention will become apparent from the following description read in conjunction with the accompanying drawings, in which like reference numerals designate the same elements.

DETAILED DESCRIPTION OF THE INVENTION

Figure 1:
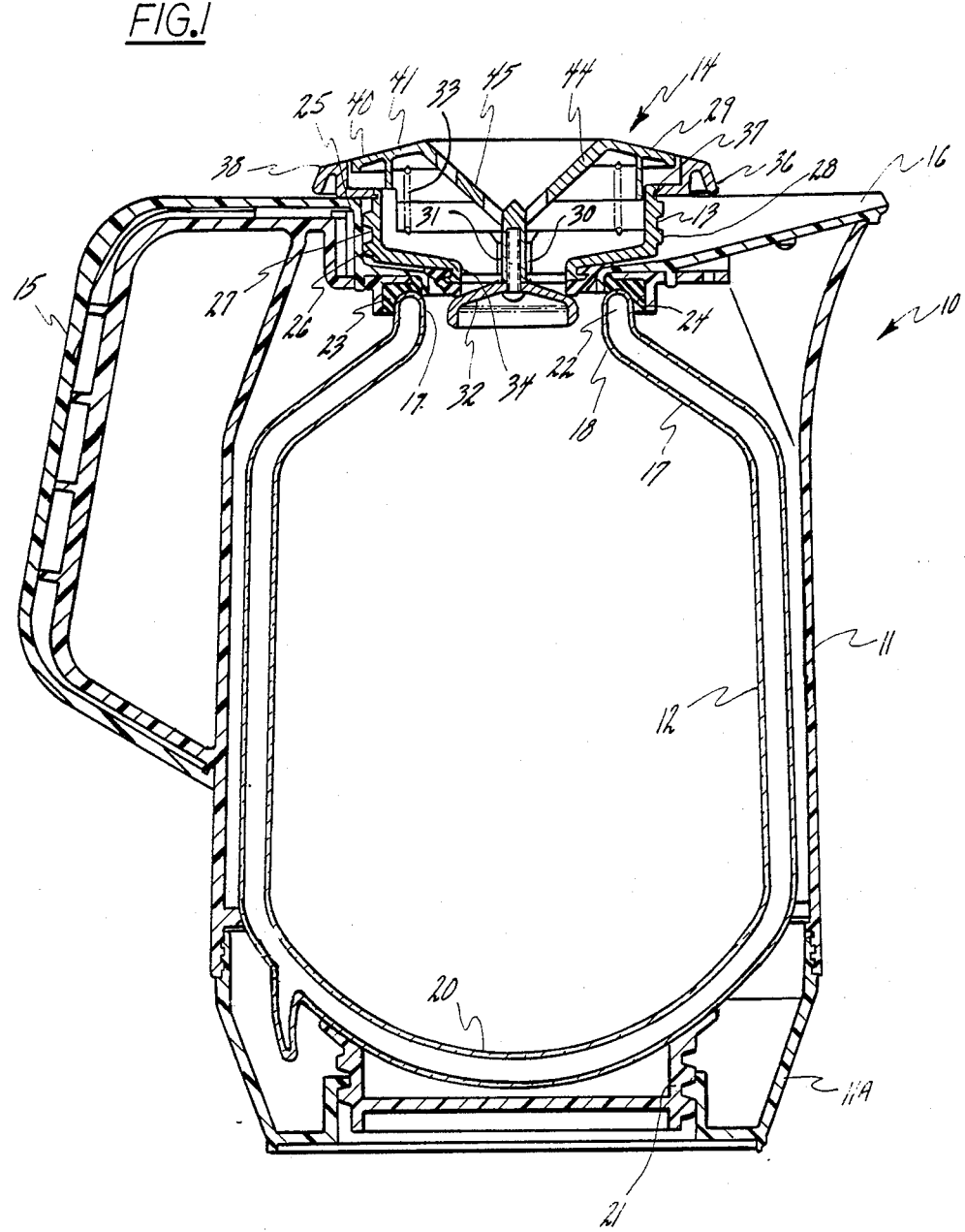
FIG. 1 is a Vertical cross section of a carafe according to an embodiment of the invention.
Figure 2:
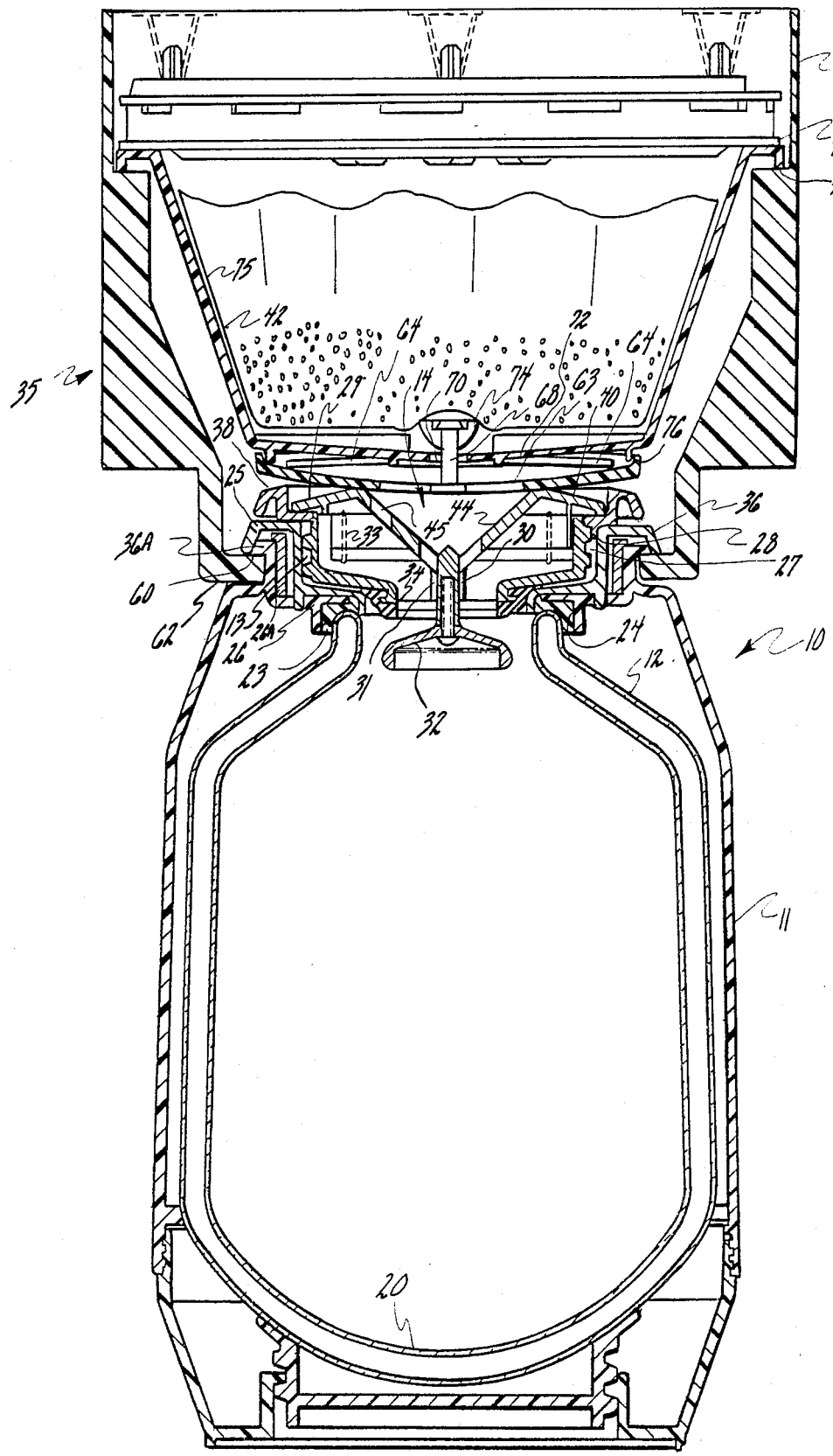
FIG. 2 is a cross sectional view of the embodiment of FIG. 1, installed in a coffee maker, and taken at 90 degrees to the cross section in FIG. 1.
Figure 3:
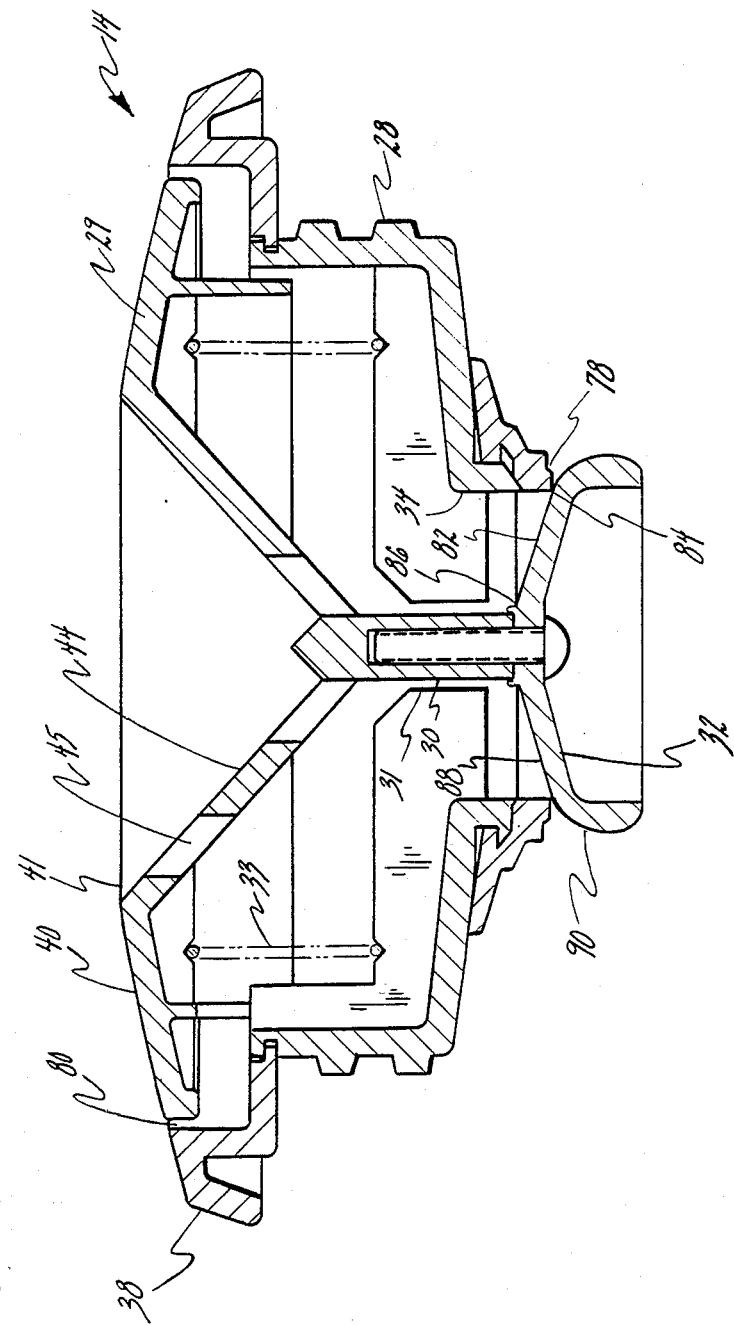
FIG. 3 is an enlarged cross section of the cap of the embodiments of FIGS. 1 and 2, shown in the condition of FIG. 2.

Referring to FIGS. 1–3 there is shown a carafe 10 such as is used to hold hot liquids as, for example, coffee or tea. Carafe 10 comprises a housing or outer shell 11 which may be made of plastic, metal or a suitable ceramic material, a heat-retaining liner 12 within outer shell 11 and a lid 14 engageable with a threaded opening in outer shell 11. Carafe 10 may also have a conventional handle 15 and pouring spout 16 for handling and dispensing the contents therein.

Liner 12 may be made of spaced glass walls 17 to prevent heat loss from the liquid within liner 12, in accordance with articles of this type well known in the art. Alternately, liner 12 may be made of a suitable plastic, ceramic or fiber-filled material. As will be seen in FIG. 1, liner 12 is in the shape of a flask having a wide throat portion 18 at an upper end 19 and being closed and sealed at its lower end 20. A small resilient support plug 21 carried by outer shell 11 beneath liner 12 cushions liner 12 within outer shell 11 to prevent damage. Support plug 21 may be threadably received within a threaded opening in a bottom insert 11A of outer shell 11.

A wide throat portion 25 of outer shell 11 is formed with a dependent downwardly extending flange 26A. Flange 26A is internally threaded with a coarse internal thread 27.

Upper end 19 of rim 22 of throat portion 18 is sealed against a resilient gasket 23 carried within an annular recess 24 in flange 26.

Lid 14 includes an external thread 28 threaded as shown in FIGS. 1 and 2, and threadably received within internal thread 27 of outer shell 11 thus forming a stopper for carafe 10. It will also be seen that the structure of lid 14 includes a somewhat funnel-shaped bobbin 29 having a stem 30 freely and vertically slidable between spaced guides 31 molded into lid 14. A stopper 32 secured to the bottom of stem 30 automatically closes carafe 10 as hereinafter more fully described.

A coil spring 33 is disposed between guides 31 and funnel-shaped bobbin 29 to spring-load funnel-shaped bobbin 29 upwardly and to urge stopper 32 against a primary seal functioning as an elastomeric valve seat 78 in an opening 34 in the bottom of lid 14 when carafe 10 is not installed in a coffee maker, shown generally at 35 in FIG. 2.

A top 36A, which may be molded or affixed upon outer shell 11, completes the structure and forms a recess 60. A flange 62, dependent from coffee maker 35 engages recess 60, when carafe 10 is installed in the brewing position shown in FIG. 2.

It will be seen from FIG. 1 that top surface 38 of collar 36 is leveled to form, with a top surface 40 of funnel-shaped bobbin 29, a substantially continuous inclined bearing surface 41. A coffee basket 42 (FIG. 2) includes a contact plate 63 urged downward by a plurality of flat springs 64. A stem 68, affixed to the center of contact plate 63 passes upward through a feed opening 70 centered in a bottom surface 72 of coffee basket 42. A resilient drip-stop stopper 74 is affixed to stem 68 inside coffee basket 42. It will be noted that drip-stop stopper 74 extends upward at least as far as stem 68, whereby a tendency to puncture a coffee filter 75 laid into coffee basket 42, is avoided. When carafe 10 is removed from coffee maker 35, contact plate 63 and drip-stop stopper 74 are urged downward by flat springs 64, thereby bringing drip-stop stopper 74 into sealing contact with an edge of feed opening 70 (this condition is not shown in the figures). In this manner, liquid is prevented from dripping from coffee basket 42 when carafe 10 is not available therebelow to catch such liquid. A plurality of limit stops 76 limit the amount by which contact plate 63 can be displaced upward. The upward limit on displacement of contact plate 63, imposed by contact with limit stops 76, also provides positive control of the downward displacement of bobbin 29.

With carafe 10 inserted into coffee maker 35, as shown in FIG. 2, contact between funnel-shaped bobbin 29 and contact plate 63 urges contact plate 63 upward against the downward urging of flat springs 64 and urges funnel-shaped bobbin 29 downward against the upward urging of coil spring 33. In the preferred embodiment, a spring constant of flat springs 64 is smaller than a spring constant of coil spring 33. Accordingly, contact plate 63 is urged upward into full contact with limit stops 76 before funnel-shaped bobbin 29 begins to move downward. As a result, complete positional relationships of funnel-shaped bobbin 29 and contact plate 63 are attained.

The flow rate of liquid through feed opening 70 is determined by the cross-sectional area thereof, minus a portion of such area blocked by stem 68. Similarly, the flow rate of liquid through opening 34 is determined by the area of a plurality of holes 45 in a funnel portion 44 centered in lid 14. In the preferred embodiment, the unblocked area of feed opening 70 is established to provide a flow rate therethrough that is less than that through holes 45. This is desirable since the position of contact plate 63 is more rigidly established than is that of funnel-shaped bobbin 29. Also, it appears especially desirable to avoid overflowing of funnel portion 44, which could occur if funnel-shaped bobbin 29 had a smaller flow rate than opening 70. The final maximum flow rate through the combination should be such that bridging contact of liquid between primary seal 78 and the adjacent surface of stopper 32 is avoided.

Referring now to FIG. 3, an enlarged view of lid 14 is shown for improved understanding of the following portion of the specification. An elastomeric valve seat 78 is affixed at the bottom of opening 34 for contact by stopper 32 in the inactive position shown. It was discovered that an air-venting problem required solution. When a liquid is poured into funnel portion 44, holes 45 almost immediately become blocked by the liquid, thereby preventing the outward passage of air displaced by the entering liquid. However, a generally clear air path 80 is provided by a relatively loose fit between an outer perimeter of top surface 40 of funnel-shaped bobbin 29 and an inner perimeter of top surface 38.

It was also discovered that special treatment is required on the surface shape of stopper 32 to avoid bridging of liquid between elastomeric valve seat 78 and stopper 32. Such bridging, which can occur at relatively low flow rates, immediately stops air venting and thus prevents smooth flow of liquid into carafe 10. An upper surface 82 of stopper 32 is specially shaped to avoid bridging.

Bridging occurs in regions where the flow velocity is low. Preferably, the flow velocity should be a maximum near a contact point 84 of upper surface 82 with elastomeric valve seat 78. A relatively smooth transition 86 turns the liquid from a vertical direction to a downward-directed generally planar portion 88. A curved end 90 has a smoothly rounded cross section which is preferably a portion of a circle. Curved end 90 begins close to contact point 84 and continues well beyond and below contact point 84. This ensures that liquid is accelerating, and moving in substantially laminar flow past contact point 84. Near the lower end of curved end 90, liquid decelerates as it prepares to drop from stopper 32. When it decelerates, its depth increases. However, since this occurs well outside contact point 84, such deceleration does not upset the clean laminar flow past contact point 84.

In the embodiment shown, stopper 32 is preferably of a relatively rigid material, preferably a plastic such as polypropylene or Nylon. In an alternative embodiment (not shown), stopper 32 is made of an elastomeric material such as, for example, silicone rubber. In this alternative embodiment, stopper 32 may provide a satisfactory seal with the lower perimeter of opening 34 without requiring elastomeric valve seat 78.

Referring again to FIG. 2, the resiliently urged contact between top surface 40 and contact plate 63 surrounding the region through which liquid flows tends to provide a seal for preventing the escape of steam, especially toward the front of coffee maker 35.

The operation of the embodiment of FIGS. 1-3 will become apparent from the foregoing description. When the coffee is to be brewed, coffee maker 35 is supplied with the desired quantity of water. Coffee basket 42 is provided with the required amount of coffee in a filter 75 overlying the bottom of coffee basket 42. Coffee basket 42 is then slid into place along track members 43 molded into coffee maker 35. Flanges 47 on coffee basket 42 hold coffee basket 42 securely against the bottom of spreader 46 during the brewing operation.

It will be evident that, when carafe 10, with lid 14 attached, is removed from coffee maker 35, the force developed by springs 33 and 64 respectively urge stopper 32 and drip-stop stopper 74 to their closed positions. In this manner, escape of flavor and cooling of liquid in liner 12 is prevented. In the suspended undercounter device illustrated, any dripping liquid is likely to fall upon a countertop below. Thus, the sealing provided by drip-stop stopper 74 is especially important in such a system.

Lid 14 is normally turned finger tight in carafe 10. When it is desired to pour coffee from the carafe 10, the user merely gives lid 14 a partial short turn which raises it sufficiently from the seals between lid 14 and flange 26A so that the coffee can be poured from pouring spout 16, after which, lid 14 can again be tightened to retain the heat in liner 12, all without removing lid 14 from carafe 10.

Although the embodiment of the invention shown in FIGS. 1-3 is embedded in the environment of an undercounter device, such is not a necessary limitation. Instead of being suspended below a coffee maker 35, a bottom 11A of outer shell 11 may rest on a supporting surface, and coffee basket 42 may be suspended above it in a style of drip coffee maker common in the marketplace at the time of filing this application. The spacing between the supporting surface and the bottom of coffee basket 42 is such that the required contact between mating elements is attained in a manner corresponding to the foregoing description.

It is contemplated that lid 14 has utility apart from the drip-stop function of drip-stop stopper 74, thus meriting separate claims. In addition, the drip-stop function of drip-stop stopper 74 has utility apart from the brew-through function of lid 14. In addition to the independent utility discussed in the foregoing sentences, the combination of lid 14 and stem 68 has cooperating functions that go beyond the individual utilities.

Having described preferred embodiments of the invention with reference to the accompanying drawings, it is to be understood that the invention is not limited to those precise embodiments, and that various changes and modifications may be affected therein by one skilled in the art without departing from the scope or spirit of the invention as defined in the appended claims.

What is claimed:
1. A carafe having a brew-through lid comprising:
means for engaging said lid atop said carafe;
a seal in said lid;
liquid dispensing apparatus;
means for permitting installation of said carafe into said liquid dispensing apparatus;
means responsive to installation of said carafe, with said lid engaged thereon into said liquid dispensing apparatus for unseating said seal;
means for permitting a liquid to flow from said liquid dispensing apparatus through said seal into said carafe once said seal is unseated, said permitting means including a funnel-shaped portion formed in said lid and including means defining at least one opening therethrough for enabling liquid to flow from said liquid dispensing apparatus to said carafe;
resilient means for seating said seal when said carafe, with said liquid engaged thereon is removed from said liquid dispensing apparatus;
said means responsive to installation includes a first element having a first contact surface on said liquid dispensing apparatus; a second contact surface on said lid operatively connected to said seal, said first and second contact surfaces engaging during installation of said carafe in said liquid dispensing apparatus for moving said second contact surface a predetermined distance to unseat said seal.

2. A carafe having a brew-through lid in accordance with claim 1 wherein said first element incorporates means for permitting a sliding installation of said carafe into said liquid dispensing apparatus, and for guiding said first and second contact surfaces into engagement for unseating said seal.

3. A carafe having a brew-through lid in accordance with claim 2, wherein said element includes at least one flange on said liquid dispensing apparatus;
said carafe having a recess formed thereon and said at least one flange of said element engaging said at least one recess of said carafe to suspend said carafe from said liquid dispensing apparatus.

4. A carafe having a brew-through lid in accordance with claim 3 wherein engagement between said first and second contact surfaces when said carafe is installed in said liquid dispensing apparatus forms a vapor seal to prevent the flow of vapor between said first and second contact surfaces.

5. A brew-through lid according to claim 1, wherein said means for permitting liquid to flow includes means for permitting air, displaced by said liquid, to flow outward from said carafe.

6. A brew-through lid according to claim 5, wherein said means for permitting air to flow includes:
said seal including a seal member and an opening:
said seal being urged into sealing contact with said opening for sealing;
said seal member being disposed below said opening, whereby, when said seal is unseated, said liquid flows over said seal member; and
said seal member includes means for preventing said liquid from bridging between itself and said opening.

7. A brew-through lid according to claim 6, wherein said means for preventing includes:
said seal member extends substantially beyond said opening; and
an outer perimeter of said seal member includes a smooth downward curve.

8. A brew-through lid according to claim 7, wherein said means for preventing further includes an outward and downward-sloping portion on said seal member substantially adjacent said opening, whereby a substantial liquid velocity is developed adjacent to said opening.

* * * * *